Figure 1:
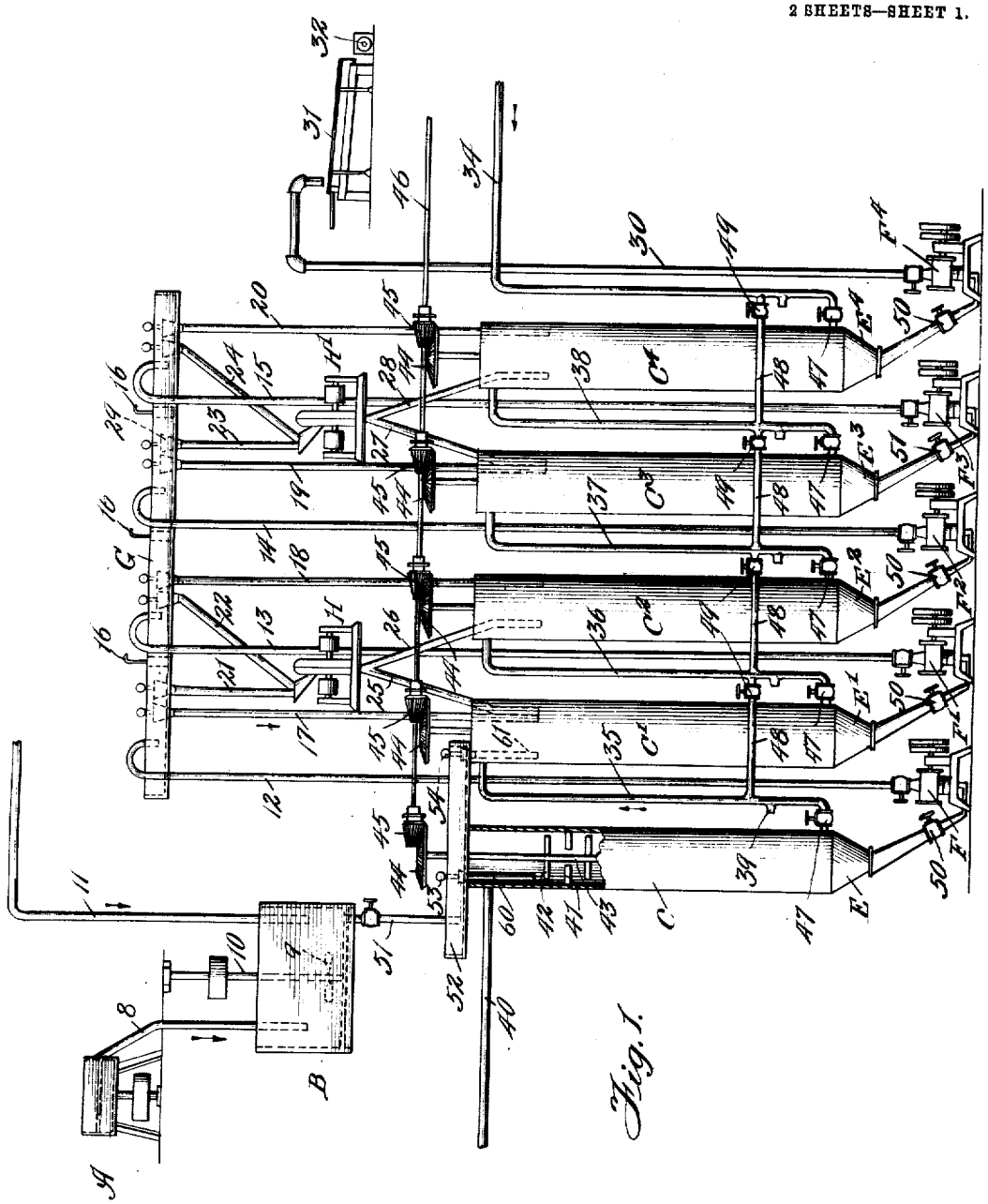

A. W. H. LENDERS.
PROCESS OF SEPARATING, WASHING, AND CONCENTRATING MATERIALS.
APPLICATION FILED NOV. 16, 1907.

948,512.

Patented Feb. 8, 1910.

2 SHEETS—SHEET 1.

Witnesses:
Inventor:
Adolph W. H. Lenders
By Otto R. Barnett
Atty.

A. W. H. LENDERS.
PROCESS OF SEPARATING, WASHING, AND CONCENTRATING MATERIALS.
APPLICATION FILED NOV. 16, 1907.
948,512.
Patented Feb. 8, 1910.
2 SHEETS—SHEET 2.
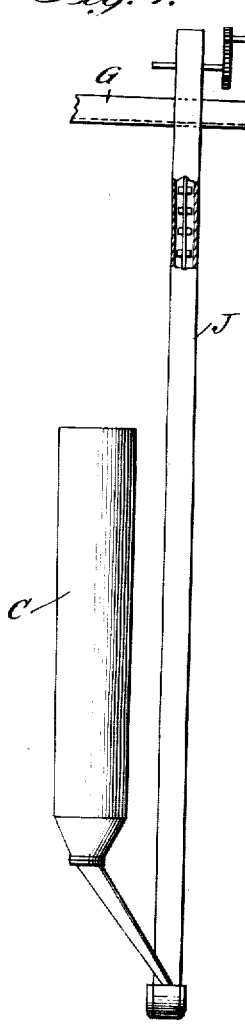
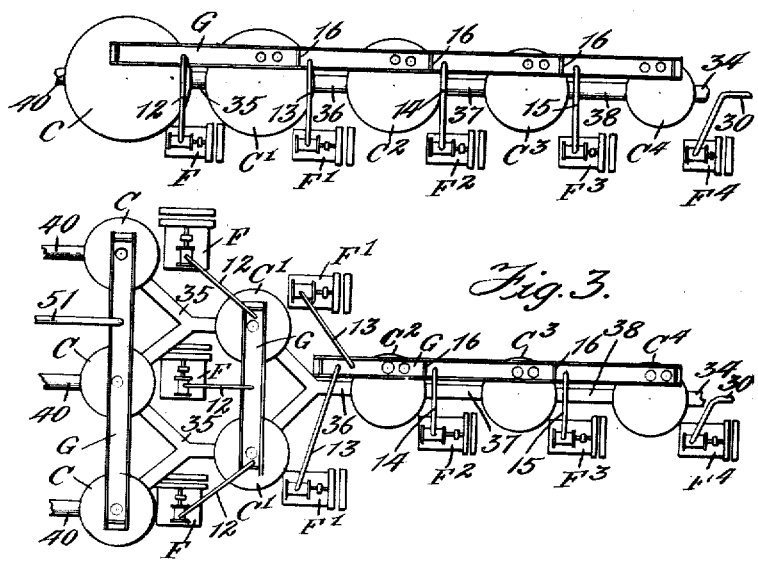
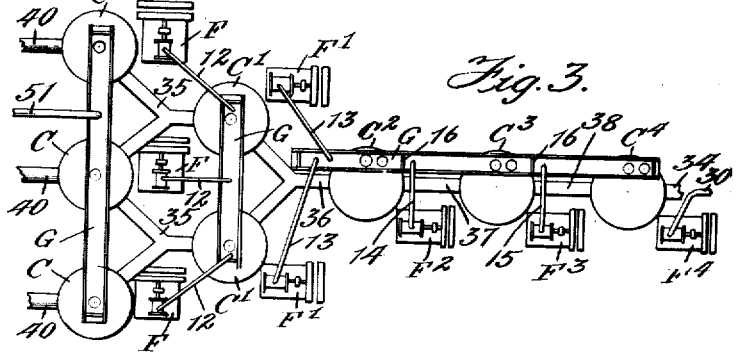
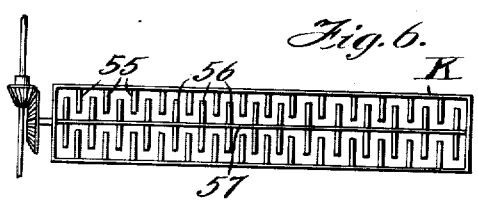
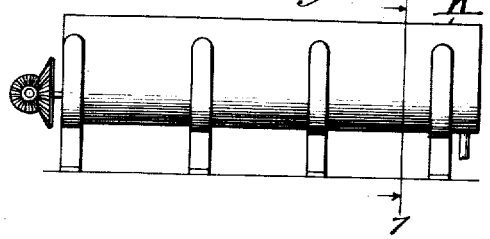
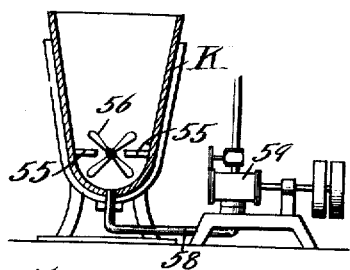
Witnesses:
Inventor:
Adolph W. H. Lenders
By Otto R. Barnett
Atty.

UNITED STATES PATENT OFFICE.

ADOLPH W. H. LENDERS, OF WAUKEGAN, ILLINOIS.

PROCESS OF SEPARATING, WASHING, AND CONCENTRATING MATERIALS.

948,512. Specification of Letters Patent. Patented Feb. 8, 1910.

Application filed November 16, 1907. Serial No. 402,471.

*To all whom it may concern:*

Be it known that I, ADOLPH W. H. LENDERS, a citizen of the United States, residing at Waukegan, in the county of Lake and State of Illinois, have invented certain new and useful Improvements in Processes of Separating, Washing, and Concentrating Materials, of which the following is a specification.

My invention relates to separating, washing and concentrating processes and in particular to the separation of the starchy material from the bran in the manufacture of starch from corn, the washing of the bran and the concentration of the resulting starch liquor.

The invention has for its object to simplify and improve the methods of separation and concentration now employed in the manufacture of starch, or similar methods employed in other arts, whereby certain expensive operations and apparatus are eliminated, the amount of water used in the separating and washing is reduced and regulated, the separation more thoroughly effected and the several steps of the process made continuous.

The invention has for other objects such new and improved methods and processes in the separation of materials, and in particular the separation of starch from other ingredients of the corn, as will be described in the following specification and set forth with particularity in the claims.

The process will be described as employed in the manufacture of starch from corn, where, as will appear, it is made use of with particular advantage. It will be obvious, however, that my improvements might be utilized in other arts where similar conditions prevail.

In making starch from corn according to the method generally used at the present time, the corn, after first being steeped, is disintegrated in iron mills and then conducted to separator tanks, where the germ is floated off. The remaining parts of the kernels of corn, consisting of the hull, starch, gluten and certain cellular or fibrous material are next ground in French bur mills and are then passed through silk shaking sieves of No. 9 mesh, the larger particles tailing off and being carried to the feed house. The starch liquor going through these sieves is next conducted to a similar set of shaking sieves, ordinarily No. 17 or No. 20, in order to remove the finely divided fibrous matter which was able to pass through the coarser mesh of the No. 9 sieves. The process of separating up to this stage of the proceeding has required a very large amount of water, an amount of water, in fact, which is too great for the starch table step which would otherwise be the next step in the process. The liquor is, therefore, conducted from the sieves to settling tanks, known in the art as cone settlers, because of their conical form, the starch concentrating in the bottom of these tanks, the dilute water at the top of the tanks being drawn off so as to reduce the liquor to the proper density. It is then stirred and run over the settling tables, where the starch settles and the gluten tails off. This process has several disadvantageous features. The silk shaking sieves are very expensive to install and expensive also to maintain, because of the high speed at which they are run, which often reaches 480 revolutions a minute. As is well known, the buildings themselves in which these shakers are installed depreciate very rapidly on account of the constant vibration of the shakers at a high speed. It is one of the objects of my improved process to eliminate the first set of shakers.

My process also eliminates the necessity for using the cone settlers by employing only so much water in the separating step as shall be necessary to produce starch liquor of the required density. The use of the first set of sieves is attended with another disadvantage in that a considerable amount of starch always tails off with the bran. This is due in part to the fact that there are particles of starch too large to go through the sieve and in part to the fact that the bran in tailing off envelops or entrains a portion of the starch. The work of separation is considered excellent if the starch found in the bran tailing off from the No. 9 sieves does not exceed 2% of the dry weight of the bran. The use of the cone settlers also involves a loss of starch, as the dilute water drawn off from the settlers always contains some particles of starch. By eliminating the first set of shakers and the cone settlers and substituting another method of separation, I am able to save a large proportion of the starch which heretofore has gone to waste.

In carrying out my process, I employ a receptacle, or series of connecting receptacles, into which the corn coming from the bur mill is introduced together with water or starch liquor. The liquid mass thus confined is caused to flow with a velocity which is sufficient to float off the particles of starch but which is not sufficient to overcome the gravity of the bran, which consequently sinks to the bottom of the receptacle or receptacles. Where a number of receptacles are used in series, the bran may be taken from the bottom of one receptacle and conducted into the next receptacle and so on through the series until it is perfectly washed. The washing is facilitated by constant agitation of the liquid within the receptacles. The starch liquor flowing from one receptacle to the next becomes gradually more and more concentrated and, by controlling the supply of the washing liquid, I am able to get an output of starch liquor at the proper density for passing over the starch tables.

Apparatus suitable for carrying out my process is shown in the accompanying drawings, wherein—

Figure 1 is a side elevation of an installation. Fig. 2 is a diagram illustrating one arrangement of cells in the battery of separators. Fig. 3 is a diagram illustrating another arrangement of the same. Fig. 4 is a detail illustrating a modification in which a conveyer is used in place of a pump and its connections. Fig. 5 is a detail of a modified form of separator in elevation. Fig. 6 is a plan view of the same; and Fig. 7 is a section on the line 7—7 of Fig. 5 looking in the direction of the arrows.

Like characters of reference indicate like parts in the several figures of the drawing.

A represents a bur mill discharging by a pipe 8 into a mixing tank B in which is an agitator 9 on a shaft 10. The mass from the bur mill may be mixed with water or light starch liquor which may be conducted to the mixing tank through the pipe 11. C, C', C², C³, and C⁴ are a series of separating tanks which preferably terminate in the funnels E, E', E², E³ and E⁴ which are connected with the pumps F, F', F², F³ and F⁴, which serve to force the settlings of the several separators into the next succeeding ones of the battery. The bran settling in the separators may be conducted directly from one separator to the next or it may be put through disintegrators between successive washing steps in order to loosen any particles of starch which may adhere to the particles of bran. I have shown, for example, pipes 12, 13, 14 and 15 leading from the pumps to a distributing trough G divided into compartments by the gates 16 and from which lead the pipes, 17, 18, 19 and 20 to successive separators; and from which also lead pipes 21, 22, 23 and 24 to the disintegrators H, H', the latter discharging into the separators through pipes 25, 26, 27 and 28. These pipes are controlled by valves 29, so that, the bran may be sent through the disintegrators or not, as desired. The bran leaves the last separator and passes through pipe 30 to the screen or equivalent device 31, where the water is taken out. From here it may be conveyed to the feed house by conveyer 32.

By introducing water or light starch liquor into separator C⁴ through pipe 34, a flow of the liquid in the separators is obtained which is opposed to the force of gravity and which has sufficient velocity to float off the starch without overcoming the gravity of the bran, which is heavier. The cells C, C' etc. may be connected in any desired manner, so as to permit a constant flow of the liquor from one to another. I have shown the cells connected by pipes 35, 36, 37 and 38. These pipes are provided with connections 39 by means of which starch liquor derived from other steps in the manufacture may be introduced into the separators. By regulating the amount of water which flows through pipe 34 or the amount or density of the starch liquor introduced into the system by means of this pipe, the liquor which becomes concentrated as it flows from C⁴ to C may be made to issue from the system at just the proper density for the settling tables. This liquor flows from the separator C through the pipe 40.

The best results are obtained by continuously agitating the liquid in the receptacles so as to wash out the starch from the bran. This agitation may be accomplished in any desired manner. Preferably I provide the separator tanks with stationary arms 41 between which revolve the agitators 42 on shaft 43, the shafts in the several separators being provided with bevel gears 44 driven by pinions 45 on the shaft 46. The agitators may be driven either intermittently first in one direction and then in another or else continuously in the same direction. If the former method is pursued, the shaft 46 will be provided with any well known form of reversing apparatus.

For convenience, the connections between the cells of the battery are such that a single cell may be cut out for purposes of repair and the like. Pipes 34, 35, 36, 37 and 38 are, therefore, provided each with a valve 47, these pipes being connected by a series of pipes 48 having valves 49. The funnels E, E' etc. are likewise provided with valves 50. In order that the first of the separators may be by-passed in case of necessity, the pipe 51, which conducts the material from the mixing tank, may lead to a distributing trough 52 which discharges through pipes 60 or 61 either into separator C or separator C', according to whether valves 53 and 54 are opened or closed.

The water carrying the starch particles as it passes from cell to cell becomes more and more concentrated. To overcome the tendency of the starch liquor when thus concentrated to carry with it particles of bran from the last of the cells, I prefer to construct my apparatus so as to gradually diminish the velocity of flow of the starch liquor as it proceeds toward the outlet. This may be done either by making the cells of gradually increasing diameter, which is the arrangement I have illustrated in the diagram of Fig. 2; or arranging the cells in groups of increasing number, which arrangement is shown in Fig. 3. In either case, the volume of the flowing liquid is gradually increased with the consequently proportional decrease in velocity.

In Fig. 4 is shown a modification in which a bucket elevator conveyer J is substituted for the pump and its connections for conducting the bran from a cell of the battery to the distributing trough.

In Figs. 5, 6 and 7 I have shown apparatus suitable for carrying out my process, in which the cells are horizontal instead of being vertical. In these figures K represents a trough in which are the stationary arms 55 and the rotating agitators 56 on the shaft 57. The bran is discharged from the trough through a pipe 58 and is pumped into the next trough by a pump 59; the starch flowing through suitable pipes from trough to trough in a manner similar to that shown in the preferred form of apparatus illustrated in Fig. 1.

In carrying out my process it will be observed that the heavier particles of material coming from the bur mill, namely, the bran, are made to pass through a receptacle or series of receptacles, preferably the latter, always against a gentle current which separates the starchy matter from the bran and gradually concentrates the former, the mixture being subjected to a continuous agitation creating cross currents, the starch issuing from the battery at one end concentrated to a proper degree for getting the best results on the starch tables, the bran issuing from the other end of the battery, thoroughly washed. In accomplishing this I make use of the difference in specific gravity between the starch and the bran in their wetted condition, the latter sinking to the bottom of the receptacles because of its greater weight, the starch being gradually concentrated in the continuous current which passes through the battery.

The ground corn, consisting of relatively light, free particles of starch and heavier particles of bran, the latter in most cases having starch adhering to them, is introduced into the first of a series of connected bodies of water below the surface and immediately above zones in which the water is given a churning agitation. The particles of bran sink to the bottom of the tanks into the quiet water below the agitators. The agitation serves to remove part of the adhering starch, but, under ordinary circumstances, the bran in the bottom of the first tank will contain considerable starch. This bran is then successively passed in the same way through the succeeding bodies of water, being thus effectually washed of the starch. In the meanwhile a continuous current is generated through the tanks in a direction opposite to that taken by the bran in its successive washings, which flow is sufficient to overcome the gravity of the starch, which is, of course, heavier than water, and which gradually concentrates the starch in the upper part of the first tank, floating it off through the outlet pipes of this tank. The agitation of the portion of the medium containing the suspended particles of bran and starch is probably necessary when the process of separation is applied to the separation of ground corn, in order that the separation should be complete. In any event, it facilitates such complete separation. The ground corn is preferably introduced into each body of medium below the surface and the liquid supplied to each body to cause the flow against gravity and the overflow of one body to the next is introduced above the place where the heavier particles settle.

It will be seen that when this process is employed as above described in the manufacture of starch it accomplished in one step and in one set of apparatus the separation of the starch from the bran and the concentration of the starch, which operations have heretofore required two distinct sets of apparatus. By the elimination of the first set of shakers I dispense with a kind of apparatus which is very costly to install, equally costly to maintain and which by its operation causes an appreciable deterioration in the building where it is located. I also get a more thorough washing of the bran, which results in a larger output of starch. The process also involves a great saving of water, which is a considerable item of expense in a large plant. By eliminating the cone settlers which, in the old process, are necessitated only by the fact that the liquor coming from the shakers is too dilute, there is also a saving in starch. Furthermore, the settling step necessarily interrupts a continuous handling of the material treated. By my process the starch may be produced from the grain by a series of continuous operations. It has been, I believe, proposed to manufacture starch by a series of continuous operations but, so far as I am aware, no method has been devised for so doing which has proved a practical success.

Another feature of the process is that it enables the production of starch liquor ready for the starch tables of a uniform and regulatable density.

It is obvious that the process might also be employed for other purposes in the art of starch making, for example, it might be used for washing the germ.

I claim:

1. The process of separating the starch element of corn from the hull, which consists in reducing the corn to a finely divided state, introducing the same into the first of a series of receptacles containing water, causing a flow through said receptacles in opposition to the force of gravity and of a velocity sufficient to float off the starch, but not sufficient to overcome the gravity of the bran, and causing the bran to be passed in succession through the several receptacles in reverse order.

2. The process of separating the starch element of corn from the hull, which consists in reducing the corn to a finely divided state, introducing it continuously into the first of a series of receptacles containing water, causing a flow through said receptacles in opposition to the force of gravity and of a velocity sufficient to float off the starch, but not sufficient to overcome the gravity of the bran, withdrawing the bran from the several receptacles, passing the same through disintegrators, and then through the succeeding receptacles.

3. The process of separating the starch element of corn from the hull, which consists in grinding the corn, continuously introducing the ground corn into the first of a series of connected bodies of liquid, removing the settlings from the first body and introducing them into the next body and so on throughout the series, continually introducing liquid into the last of the series of bodies and from the last into the others so as to cause a flow through the series against the force of gravity and of sufficient velocity to carry with it the starch particles, floating off the concentrated starch from the first body, and continuously giving the liquid containing the particles of starch and hull in suspension a churning agitation.

4. The process of separating the starch element of corn from the hull, which consists in grinding the corn, causing the bran and adhering starch to be passed by gravity through successive bodies of liquid, causing a flow through said bodies of liquid in the opposite direction which is of sufficient velocity to overcome the gravity of the starch particles without preventing the bran from settling, and giving a churning agitation to the parts of the liquid containing the bran particles in suspension.

5. The process of separating the starch element of corn from the hull, which consists in grinding the corn, causing the bran and adhering starch to be passed by gravity through successive bodies of liquid, causing a flow through said bodies of liquid in the opposite direction which is of sufficient velocity to overcome the gravity of the starch particles without preventing the bran from settling, giving a churning agitation to the parts of the liquid containing the bran particles in suspension, and diminishing the rate of flow of the liquid as it becomes heavier with starch.

ADOLPH W. H. LENDERS.

Witnesses:
PERCIVAL H. TRUMA.
H. L. PECK.

It is hereby certified that in Letters Patent No. 948,512, granted February 8, 1910 upon the application of Adolph W. H. Lenders, of Waukegan, Illinois, for an improvement in "Processes of Separating, Washing, and Concentrating Materials," an error appears in the printed specification requiring correction as follows: Page 3, line 100, the word "accomplished" should read *accomplishes;* and that the said Letters Patent should be read with this correction therein that the same may conform to the record of the case in the Patent Office.

Signed and sealed this 1st day of March, A. D., 1910.

[SEAL.]

C. C. BILLINGS,
*Acting Commissioner of Patents.*